United States Patent

[11] 3,630,209

[72] Inventors Stewart F. Metzger
Route #4;
Wallace T. Dirks, 1723 Nixon Ave., both of
Nampa, Idaho 83651
[21] Appl. No. 1,375
[22] Filed Jan. 8, 1970
[45] Patented Dec. 28, 1971

[54] FEED CONTROL SYSTEM FOR COMBINE
2 Claims, 5 Drawing Figs.

[52] U.S. Cl. .................................................. 130/27 F
[51] Int. Cl. ...................................................... A01f 12/52
[50] Field of Search ........................................... 130/27 R,
27 F, 27 H, 27 HA

[56] References Cited
UNITED STATES PATENTS
3,238,949 3/1966 Jarvis .......................... 130/27 F
3,259,134 7/1966 Stokland ......................... 130/27
2,433,162 12/1947 Scranton et al. ............... 130/27 F

*Primary Examiner*—Antonio F. Guida
*Attorneys*—Clarence A. O'Brien and Harvey B. Jacobson ABSTRACT: A mechanism for improving the efficiency of threshing in a combine between a feed conveyor chain and a threshing cylinder. The mechanism includes a paddle wheel disposed between the chain and the cylinder for smoothly force feeding material from the chain onto the rasp bar surface of the cylinder. The housing of the conveyor chain has a door formed on the upper end thereof for permitting the return of incompletely threshed material onto the conveyor chain. This allows the mixing of the incompletely threshed material with the unprocessed material riding on the conveyor chain thereby substantially decreasing the likelihood of damage to incompletely threshed material as it becomes redelivered to the threshing cylinder via the paddle wheel.

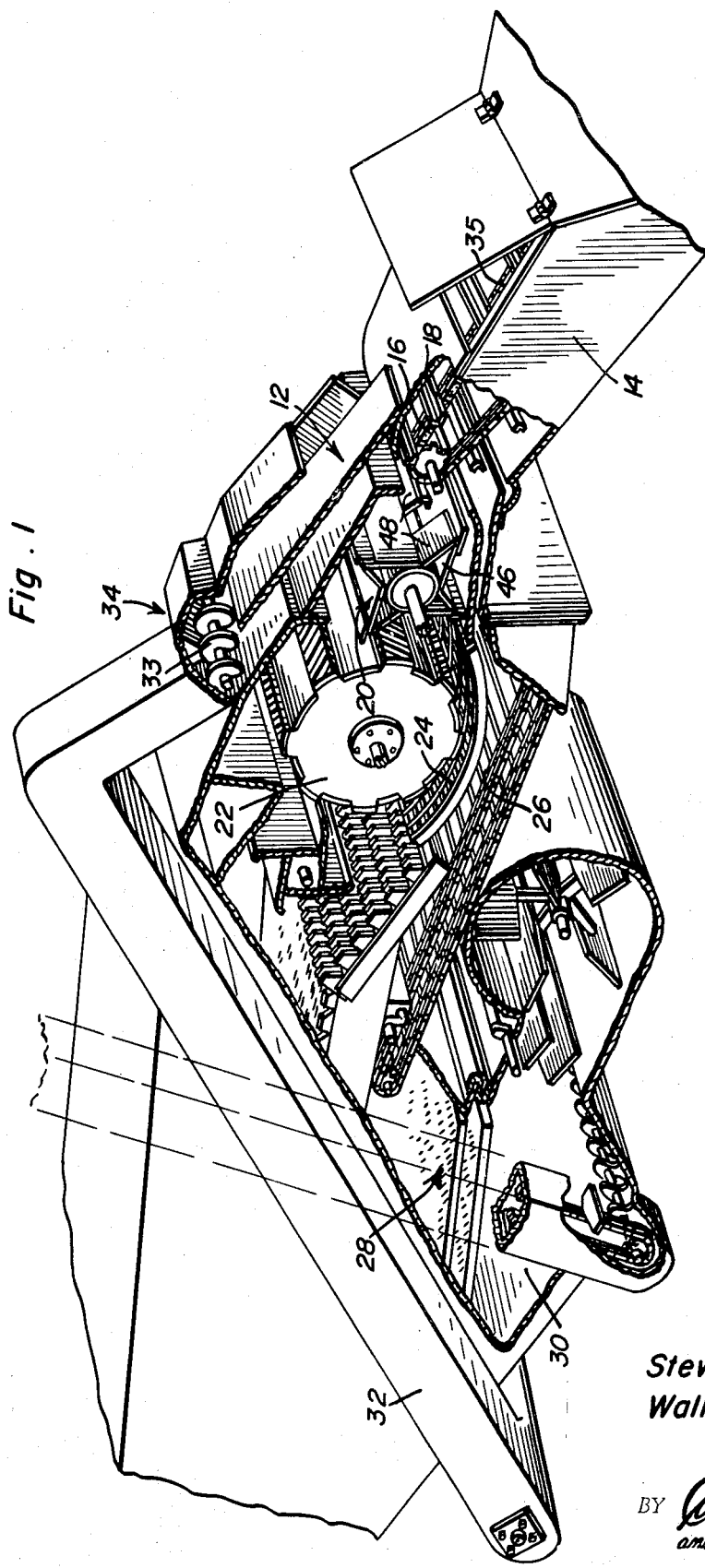

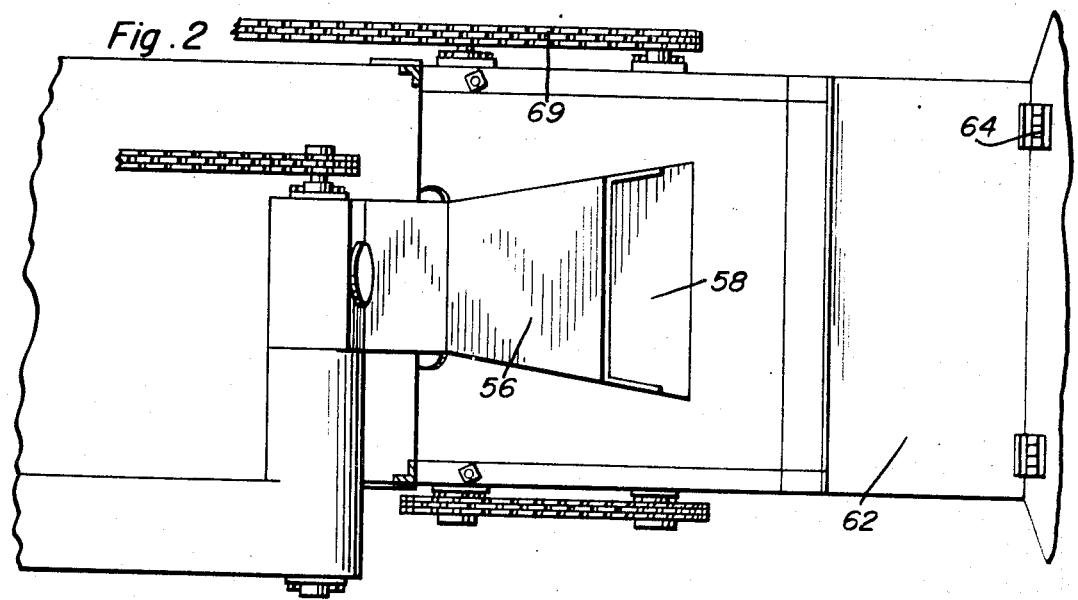
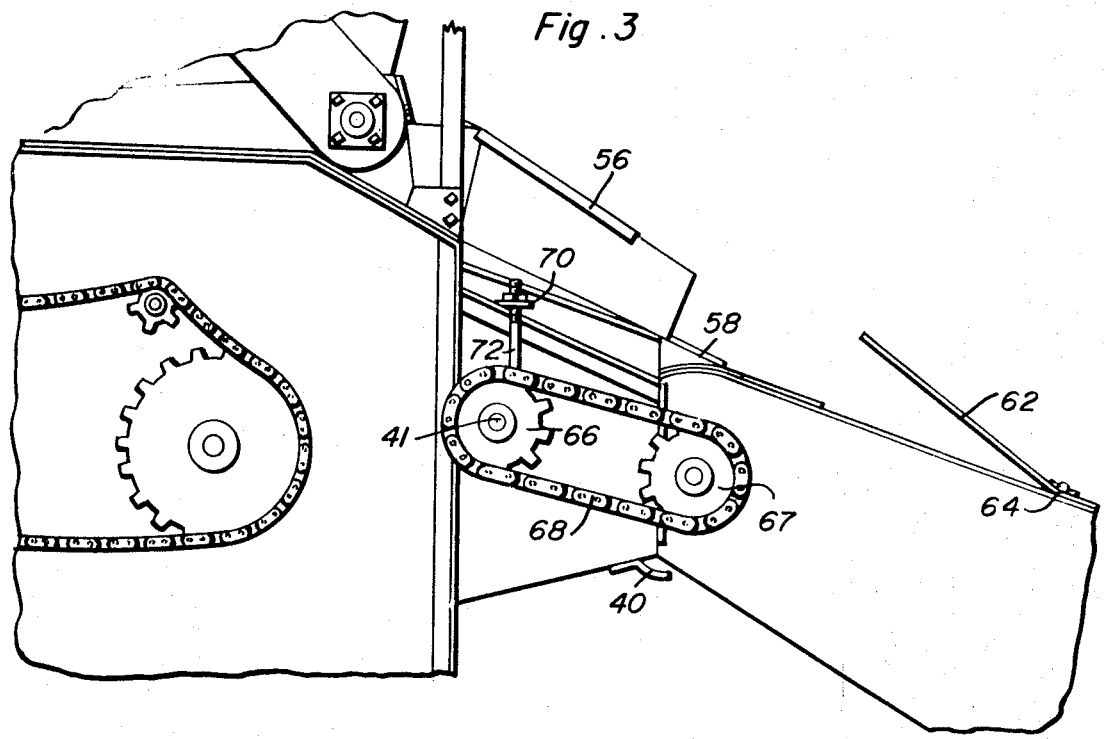
Stewart F. Metzger
Wallace T. Dirks

Stewart F. Metzger
Wallace T. Dirks

FEED CONTROL SYSTEM FOR COMBINE

The present invention relates to combine feed control mechanisms.

The conventional combine includes a feed conveyor chain enclosed within a housing and serves to deliver cut material from the field to a threshing cylinder having rasp bars on the surface thereof. The bars rotate above a threshing grate through which the threshed material falls. A separator assembly in the combine collects incompletely threshed material and conveys it to a cross auger which in turn feeds the incompletely threshed material onto the top of the cylinder for reprocessing. Although present combines operate satisfactorily, it has been found that significant portion of the threshed material becomes injured due to bunching in the space between the outlet end of the conveyor chain and the threshing cylinder. Also, injury occurs to incompletely threshed material along the redelivery path.

The primary object of the present invention is to facilitate even feeding into a slow moving threshing cylinder. A slow moving cylinder is required in certain seed crops to reduce mechanical injury and maintain germination at the highest possible level.

Germination standard are established by the U.S. Government and state agencies and when these standards are not met, serious financial losses can be incurred by the grower because the crop is drastically reduced in value, if it is not usable for seed. In most cases these losses can be traced directly to mechanical damage caused by high cylinder speeds or other controllable factors when the crop is threshed. Whenever the cylinder is slowed down beyond a certain tolerable speed, a large portion of the crop is thrown out on the ground and lost.

When a threshing machine cylinder is running at low speeds the material being fed into the machine cannot be taken into the cylinder fast enough so that there is a tendency for this incompletely threshed material to buildup in front of the cylinder and be carried back to he conveyor chain for partial return to the lower inlet end thereof. Thus, with respect to this material, undesired feedback of the material to the conveyor chain inlet occurs resulting in material loss back to the field.

By virtue of the present invention, a paddle wheel is disposed intermediate the outlet end of the conveyor chain and the threshing cylinder. The paddles on the wheel are timed to coincide with the conveying cross members on the chain which bring the material up to the cylinder. This timing brings about smooth and continuous force feeding of unthreshed material into the cylinder by the paddle wheel.

The housing which encloses the paddle wheel is sloped downwardly toward the cylinder at a reduced angle of flow relative to conventional combines, and because of the combined action of the force feeding by the paddles and the downward slop of the housing, very little, if any material is returned to the conveyor chain for reprocessing as incompletely threshed material. Due to this high efficiency, a marked reduction in the risk of mechanical injury to the seed is realized. Normally, such injury would occur from continuously subjecting the incompletely threshed material to the feeder chain, cylinder, and the supporting housing. The feed control apparatus of the present invention prevents bunching of unthreshed vines and other extraneous material which is a constant annoyance to the machine operator resulting in time consumption and financial loss during the harvest season.

A further object of the present invention is to modify the usual return route for incompletely threshed material so that it becomes deposited ahead of the cylinder and mixed with newly introduced material. This reduces any mechanical damage that can occur from bare seed falling on top of rotating cylinder as it does in conventional threshers.

Still another object of the present invention is to mount arcuate blank plates between the rasp bars on the threshing cylinder so that the spaces between these bars are substantially reduced. This in effect forces all material to pass between the cylinder and the threshing grate to preclude material from escaping unthreshed through the spaces in the cylinder between the rasp bars. This loss usually amounts to a substantial portion of a crop where a slow moving cylinder is involved.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a fragmentary cutaway view illustrating the components of the present invention in the environment of a modified conventional combine.

FIG. 2 is a top plan view illustrating a return route for incompletely threshed material.

FIG. 3 is a side elevational view illustrating the return route of FIG. 2.

Figure 4:
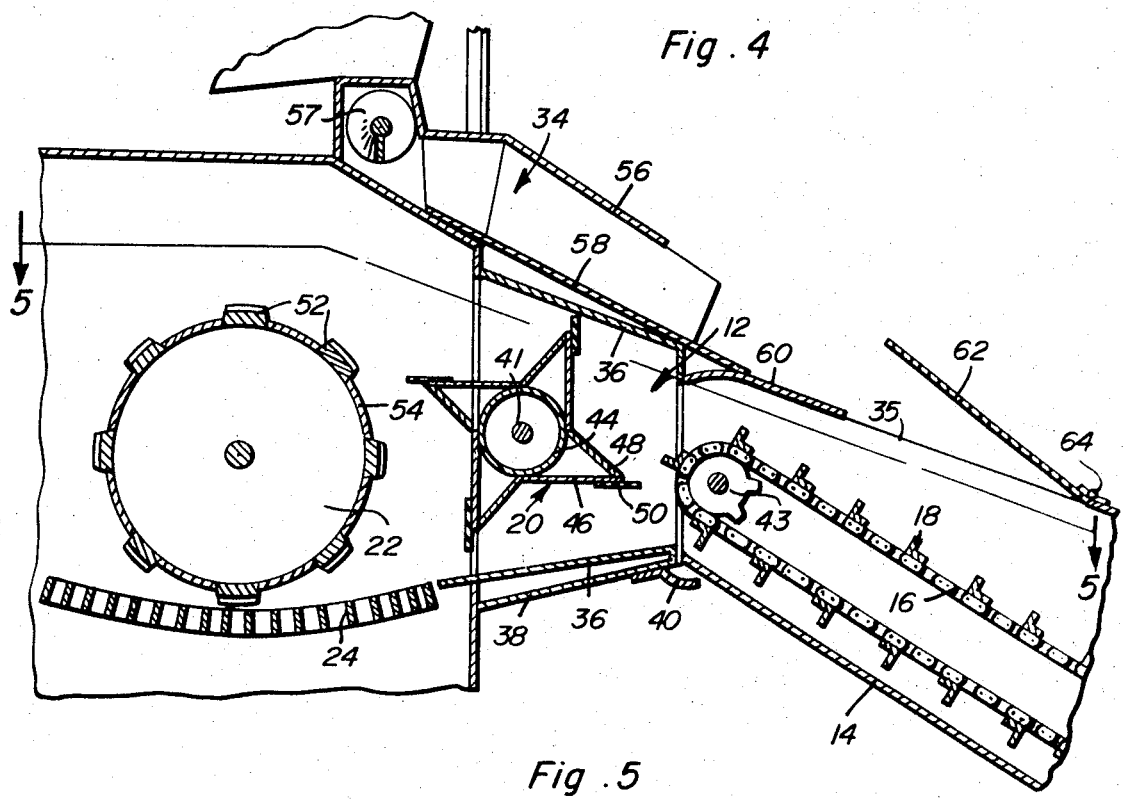
FIG. 4 is a sectional view illustrating the disposition of the present paddle wheel between the conveyor chain and the threshing cylinder.
Figure 5:
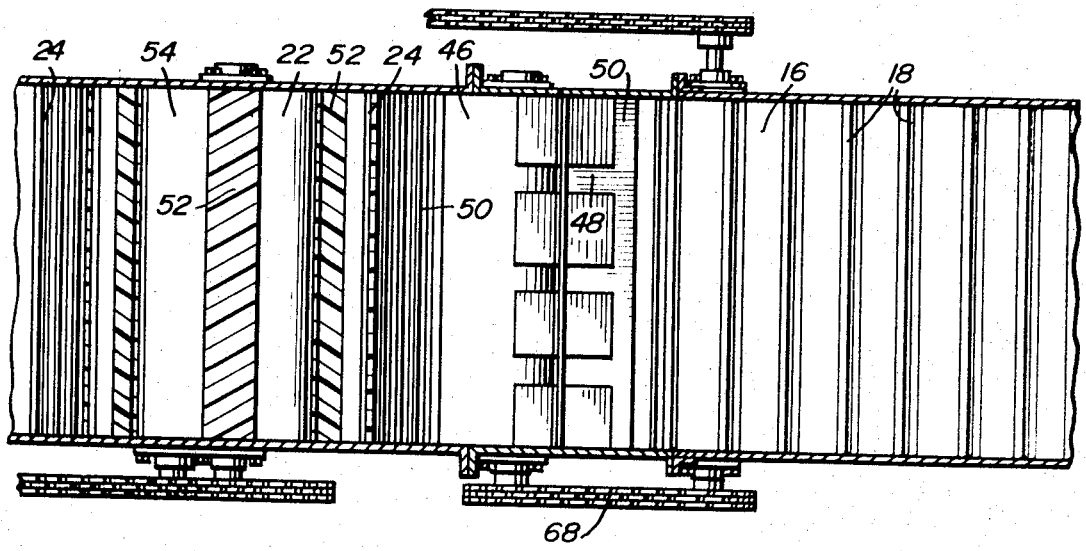
FIG. 5 is a sectional view taken along a plane passing through section line 5—5 of FIG. 4.

Referring to the figures and initially FIG. 1, reference numeral 12 generally indicates the region of a conventional combine which includes the improvements constituting the present invention. Briefly, a housing 14 encloses the usual feeder conveyor chain 16 having crosspieces 16 for carrying cut material up the housing for further processing by combine components. In the improvement of the present invention a paddle wheel 20 is positioned between the upper outlet end of the conveyor chain 16 and a threshing cylinder 22, the latter usually being positioned adjacent the outlet end of the conveyor chain. By modifying conventional structure to include the paddle wheel 20, a more efficient threshing process can be realized. A threshing grate 24 is disposed below the cylinder 22 which allows threshed material to fall through the grate onto a conveyor 26. Subsequent processing screens, well known in the art, are generally indicated by reference numeral 28 and serve to separate completely threshed material from incompletely threshed material. The incompletely threshed material falls on housing floor 30 and is subsequently fed to an elevator 34 wherein the unthreshed material is received by a cross auger 33. An enclosed chute generally indicated by 34 provides a flow path between the auger and an opening 35 formed in the top wall of the conveyor chain housing 14. Thus, the incompletely threshed material is returned to the threshing apparatus by being deposited directly upon the conveyor chain which has the effect of decreasing injury to the return incompletely threshed material.

Referring to FIG. 4, the components of the present invention will be seen in greater particularity to include a housing for the paddle wheel 20 having upper and lower walls 36 connecting the outlet end of the conveyor chain 16 and the entrance space adjacent the threshing cylinder 22. A lower reinforcing wall 38 mounts a strip 40 which bridges the housing wall 38 with the lower conveyor chain housing 14 for decreasing dribble from the outlet end of the conveyor chain.

The structure of the paddle wheel 20 is seen to rotate relative to a driving shaft 41 which is disposed in parallel spaced relation to the shaft of the upper sprocket wheel 43 that drives the upper end of the chain conveyor 16. A cylindrical hub 44 is concentrically mounted on shaft 41 and four push blades 46 are tangentially mounted to the hub in quadrant spaced relationship.

As will be more clearly illustrated in FIG. 1, a number of aligned spaced webs are connected between the hub 44 and a lower end of each trailing blade surface. Referring to FIG. 4, the connection of the reinforcing webs 48 to each blade 46 is seen to complete triangular paddle wheel sections the apex edge of each section mounting a narrow rectangular plate 50 which increases the paddling efficiency of the wheel.

As the paddle wheel rotates, unthreshed material is pushed through the paddle wheel housing and onto the surface of the threshing cylinder 22. It has been found that by inclining the lower paddle wheel housing wall 36 to an acute angle less than 45° the efficiency of feeding the unthreshed material from the paddle wheel to the cylinder is substantially increased. As illustrated in FIG. 4, the threshing cylinder 52 includes a number of peripherally spaced and axially extending rasp bars 52 that characterize the conventional cylinder. However, in a preferred embodiment of the present invention, the spaces between these rasp bars are filled with arcuate blank plates 54 which minimize the space between the bars. By so doing, it has been found that a greater proportion of the material delivered to the cylinder becomes completely threshed.

For that portion of the material falling through grate 24 which does not become completely threshed, means are provided for conveying incompletely threshed material to a cross auger 57. A return conduit 34 is mounted to the combine so that a communicating path is developed between auger 57 and an opening 35 cut in the conveyor chain housing 14. The conduit 34 has upper and lower downwardly inclined walls 56 and 58 opening at their lowest end over the upper end 60 of the conveyor chain housing 14. A flap door 62 covering the opening 35 is opened about hinge 64 and suitably secured in an open position so that incompletely threshed material exits from the conduit 34 and becomes deflected by door 62 through an opening 35 for deposit onto the conveyor chain 16. As previously mentioned, the returned incompletely threshed material becomes mixed with the unthreshed material to minimize the likelihood of mechanical injury to bare seed as the returned incompletely threshed material is subjected to the conveyor chain, paddle wheel, and threshing cylinder.

Referring to FIGS. 2 and 3, a first sprocket wheel 66 keyed to paddle wheel shaft 41, will be seen to be mounted on the exterior of the paddle wheel housing and serves to mount a link chain 68. In a similar manner, chain 68 entrains a sprocket wheel 67 at the opposite end thereof, the latter sprocket wheel driving the upper end of the conveyor chain 16 (FIG. 4). As indicated in FIG. 2, a main driving chain 69 produces motion of the conveyor chain and the connected sprocket wheel 67. Thus, by virtue of the link chain 68 connecting sprocket wheels 66 and 67, synchronous rotation of the conveyor chain and the paddle wheel is effected to produce efficient conveyance of material from the conveyor chain to the threshing cylinder.

A bolt 72 has a lower end thereof journaling shaft 41 while an upper end of bolt 72 is received within a bracket 70 mounted to the paddle wheel housing. By adjusting the bolt 72 relative to bracket 70, the elevation of paddle wheel 41 relative to the upper outlet end of the conveyor chain (FIG. 4) can be varied.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In a combine incorporating a feeder conveyor chain and a rasp bar cylinder rearward of the outlet end of the feed conveyor chain, a material delivery unit disposed between the outlet end of the feeder conveyor chain and the rasp bar cylinder, said delivery unit comprising a housing for providing passage between the conveyor chain and the cylinder, a paddle wheel positioned in the housing for a timed force feeding of material from the conveyor chain outlet to the cylinder to insure a smooth continuing and nonbunching flow thereto, timing means interrelated between the conveyor chain and the paddle for feeding material from the conveyor chain to the wheel at a predetermined rate for subsequent force feeding of the material to the cylinder also at a predetermined rate, a return system for receiving and reintroducing incompletely threshed material, said return system receiving the incompletely threshed material beyond the rasp bar cylinder and transporting the incompletely threshed material along a return path for subsequent deposit thereof on the feeder conveyor chain at a point forward the conveyor chain outlet for a subsequent timed reception thereof by the paddle wheel and reintroduction to the rasp bar cylinder whereby the rate of material introduction to and through the paddle wheel is not affected by the recycling of the incomplete threshed material, and an elongated housing about said conveyor chain, said housing having an opening in the top thereof exposing the conveyor chain forward of the outlet thereof, said return system incorporating auger means and elevator means effecting a direct discharge of the incompletely threshed material through the housing opening.

2. The combine of claim 1 wherein the paddle wheel comprises a driven hub having a plurality of tangentially orientated blades secured thereto and projecting a substantial distance outwardly therefrom at equally spaced points thereabout, and a plurality of blade reinforcing webs connected between the hub and the trailing surface of each blade adjacent the other edge thereof.

* * * * *